May 18, 1937.  H. P. PHILLIPS  2,080,898
VENTILATED PISTON RING
Filed Dec. 4, 1933   3 Sheets-Sheet 1

INVENTOR:
Harold P. Phillips
BY
ATTORNEY.

INVENTOR:
Harold P. Phillips,
BY
ATTORNEY.

May 18, 1937.  H. P. PHILLIPS  2,080,898
VENTILATED PISTON RING
Filed Dec. 4, 1933    3 Sheets-Sheet 3

INVENTOR:
Harold P. Phillips.
BY
ATTORNEY.

Patented May 18, 1937

2,080,898

UNITED STATES PATENT OFFICE 2,080,898

VENTILATED PISTON RING

Harold P. Phillips, Maplewood, Mo.

Application December 4, 1933, Serial No. 700,805

16 Claims. (Cl. 309—45)

This invention relates to piston rings for internal combustion engines, and, more particularly to that class of rings known as oil rings.

The object of my present invention is the provision of means in the form of a piston packing ring so constructed as to efficiently function as an oil ring to prevent any excess lubricant working up the cylinder walls into the combustion chamber of an internal combustion engine by directing any excess lubricant through ventilating recesses in the ring for return to the crank-case through openings in the wall of a piston.

A further object of the invention is the provision of a ventilated piston packing ring which will neither allow the cylinder wall to become excessively lubricated, or to become too dry.

A further object of the invention is the provision of a piston packing ring having two series of arcuate ventilating recesses arranged in staggered relation with one set fully open to the outer periphery of the ring, fully open to the lower end face of the ring and partially open to the inner periphery of the ring.

A further object of the invention is the provision of a piston packing ring having two series of interconnected ventilating recesses.

A further object of the invention is the provision of a piston packing ring having groove connected arcuately shaped ventilating recesses.

A still further object of the invention is the provision of a piston packing ring having ventilating recesses provided with end walls converging from the outer to the inner peripheries of the ring.

And, a still further object of the invention is the provision of a piston packing ring having arcuately shaped ventilating recesses.

A still further object of the invention is the provision of a piston ring which possesses advantages in points of simplicity and efficiency, and, at the same time proves itself comparatively inexpensive in cost of manufacture.

With the above and other objects in view, the invention consists in the novel features of construction, arrangement and combination of parts hereinafter more fully described and finally pointed out in the claims hereto appended.

Referring to the accompanying drawings.

Figure 1:
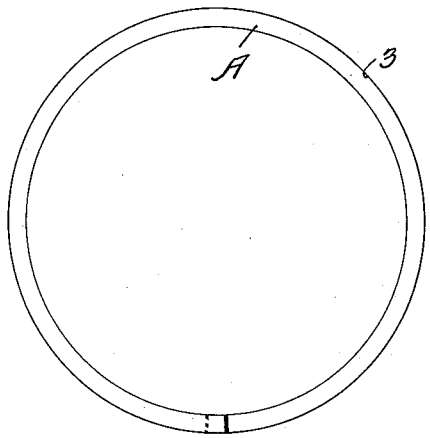
Fig. 1 is a top plan view of a piston packing ring embodying the features of my invention.
Figure 2:
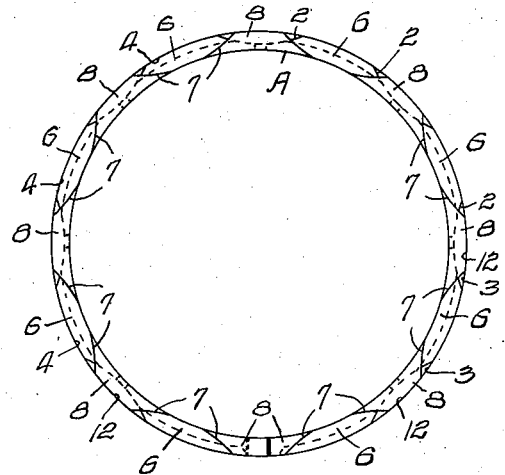
Fig. 2 is a bottom plan view of the ring.
Figure 3:
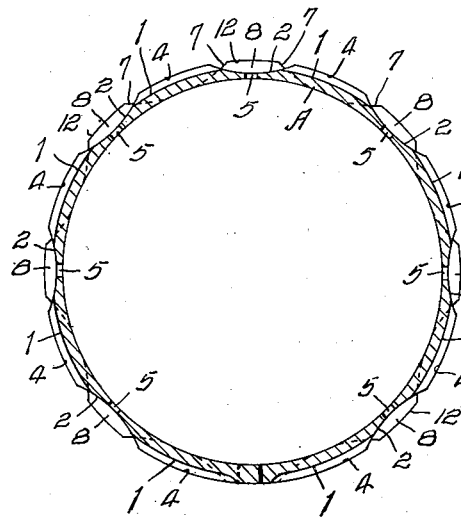
Fig. 3 is a horizontal sectional view of the ring taken through one series of ventilating recesses.
Figure 7:
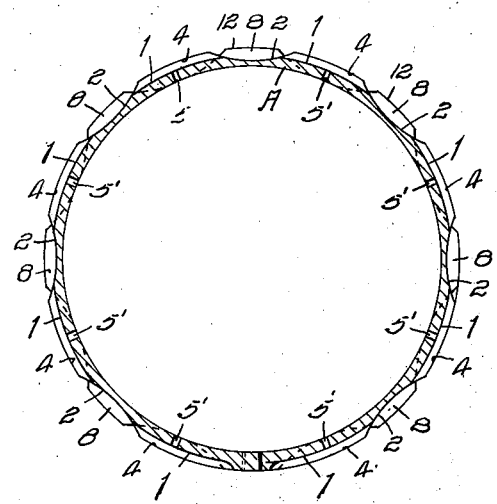
Fig. 7 is a modified form of the ring shown in Fig. 3.
Figure 4:
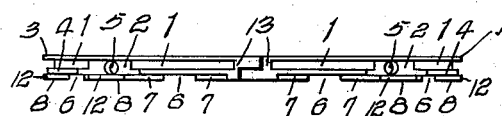
Fig. 4 is a side elevation of the ring.
Figures 5, 6:
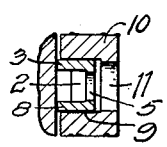
Fig. 5 is an enlarged transverse section taken through one of a series of ventilating recesses and showing a portion of a piston in which the piston packing ring is mounted and a portion of a cylinder wall engaged by the lands of the ring.
Fig. 6 is an enlarged transverse section taken through one of another series of ventilating recesses showing a portion of a piston in which the piston packing ring is mounted and a portion of a cylinder wall engaged by the ring.
Figure 8:
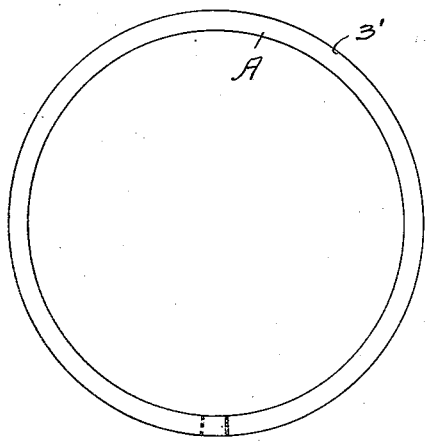
Fig. 8 is a top plan view of a modified form of piston packing ring.
Figure 9:
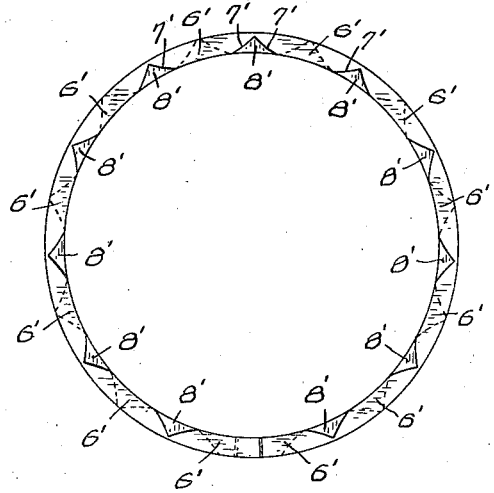
Fig. 9 is a bottom plan view of the ring shown in Fig. 8.
Figure 10:
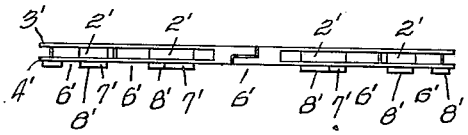
Fig. 10 is a side elevation of the modified form of ring.
Figure 11:
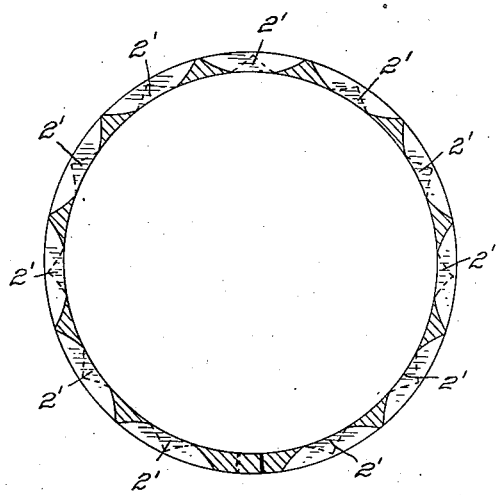
Fig. 11 is a horizontal sectional view of the ring taken through one series of ventilating recesses therein.

In carrying out one embodiment of my present piston packing ring, as illustrated in Figs. 1 to 6, inclusive, I employ a suitable resilient metallic piston packing ring member designated generally as A. The outer peripheral face of the ring is provided with a plurality of suitable channels 1, and a plurality of suitable arcuately shaped recesses 2, which channels and recesses are interconnected in alternate relation to provide a single upper land 3 and a plurality of spaced lower lands 4, which lower lands 4 are separated by the formation of the recesses 2. The ring is provided, as shown in Fig. 3, with a plurality of suitable ventilating openings 5, one for each recess 2, and these openings serve to transform the superficial recesses into ventilating recesses, as the openings are open to both the surfaces of the recesses 2 and to the inner peripheral face of the ring. The ventilating openings may, if desired, be formed in the ring intermediate the recesses 2, and open to the base of the channels and the inner peripheral face of the ring, as shown at 5' in Fig. 7. In this latter showing, the channels 1 are ventilated and the recesses are not.

The lower end face of the ring so described is provided with a plurality of ventilating recesses 6, shown as disposed below the lower lands 4. The ventilating recesses 6 are fully open to the outer peripheral face of the ring, fully open to the lower face of the ring and partially open to the inner peripheral face of the ring. The end walls 7 of the ventilating recesses 6 converge from the outer face of the ring to the inner face thereof with the inner edges of the end walls terminating in suitable spaced relation at the inner peripheral face of the ring. The end walls are preferably, although not necessarily, arcuately shaped, as shown. The ventilated recesses 6 are disposed in overlapping relation to the recesses 2, so as to become interconnected therewith to permit the recesses to drain from their ends into the ventilated recesses 6, as clearly shown in Figs. 2 and 3.

By forming the arcuately shaped ventilated recesses 6 in the lower end face of the ring, it will be observed they provide the lower end of the ring with a plurality of spaced angularly shaped projections, or tabs 8, which are adapted to be seated on the lower wall 9 of a piston ring groove formed on a piston 10.

The ventilated ring is primarily adapted to serve in use as an oil ring for pistons, so that any surplus oil accumulation can be drained back into the crank-case of a motor through openings 11 in the wall of the piston adjacent the ring groove receiving the ventilated piston packing ring.

Each ring projection 8 serves as a lowermost land 12, and as such also serves as a lower wall for the ventilated recesses 2. The superficial recesses 2 and the ventilated recesses 6 are arranged circumferentially of the ring in staggered relation and the recesses 2 serve to break the continuity of the lands 4 while the ventilated recesses 6 serve to break the continuity of the lands 12. The lower faces of the lands 4 and the upper faces of the lands 12 are shown as disposed in a plane with each other.

The channels 1 at the ends of the ring are shown as bridged, as at 13, thus closing the ends of the channels 1 adjacent the ends of the ring. However, the bridged portions 13 may, if desired, be eliminated, thus leaving the channels 1 open to the ends of the ring.

In Figs. 8, 9, 10, and 11, I have shown a modified form of piston packing ring A. This ring is shown as having a plurality of spaced circumferentially arranged ventilated recesses 2' providing thereby upper and lower lands 3' and 4'. The ventilated recesses 2' are not groove connected, as are the ventilated recesses 2 shown in Fig. 3.

The lower end face of this form of ring is provided with a plurality of ventilating recesses 6' shown as disposed in staggered relations to the recesses 2', as are the recesses 2 and 6 shown in Fig. 3, and the end walls thereof are arcuately shaped as at 7' the same as the end walls 7 shown in Fig. 3. By forming the arcuately shaped ventilating recesses 6' in the lower face of the ring, there is provided thereby a plurality of spaced angularly shaped projections, or tabs 8' similar to the projections 8 in Fig. 3, but of less length than projections 8, thereby eliminating the lower lands 12 shown in Fig. 3.

Figure 12:
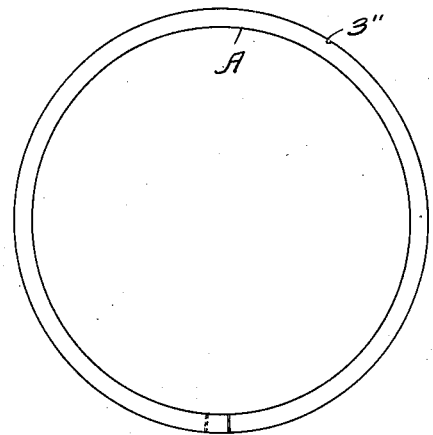
Fig. 12 is a top plan view of a further modified form of piston packing ring.
Figure 13:
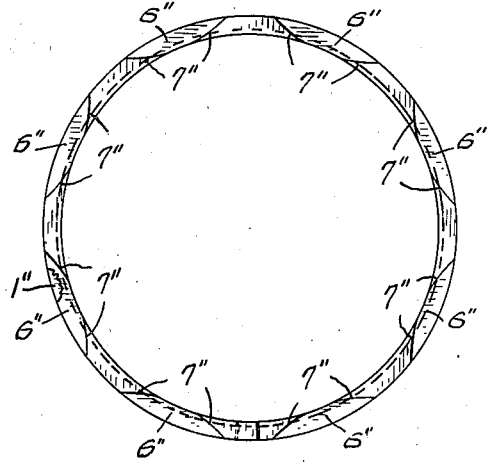
Fig. 13 is a bottom plan view of the ring.
Figure 14:
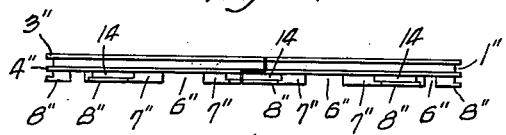
Fig. 14 is a front elevation of the ring.

In Figs. 12, 13, and 14, I have shown a further modified form of piston packing ring A. This ring is shown as having a superficial channel 1" forming an upper land 3" and a lower land 4". This form of ring has its lower end face provided with a plurality of ventilating recesses 6" similar to recesses 6 in Fig. 3, and the end walls thereof are arcuately shaped, as at 7" the same as the end walls 7 shown in Fig. 3. By forming the arcuately shaped ventilating recesses 6" in the lower end face of the ring and open to the outer and inner peripheries and to the lower face of the ring, there is provided thereby a plurality of spaced angularly shaped projections, or tabs 8" similar to the projections 8 shown in Figs. 2 and 3. However, in this instance, the outer peripheral faces of the projections 8" are each provided with a channel 14 so that the recesses 6" will be groove connected.

Figure 15:
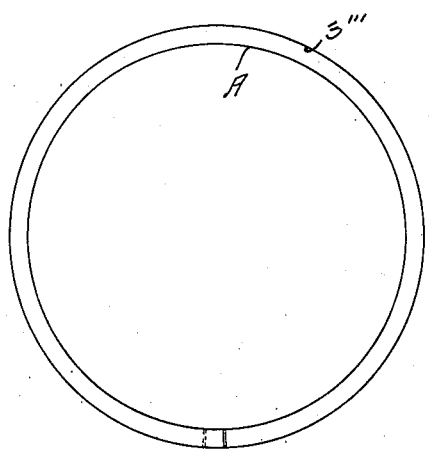
Fig. 15 is a top plan view of a still further modified form of piston packing ring.
Figure 16:
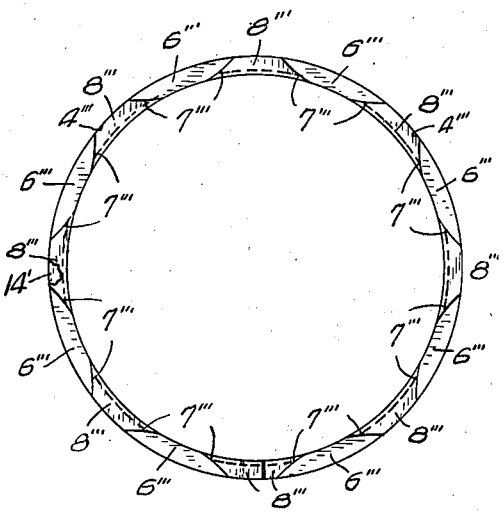
Fig. 16 is a bottom plan view of the ring.
Figure 17:
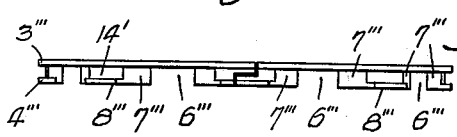
Fig. 17 is a side elevation of the ring.

In Figs. 15, 16, and 17, I have shown a still further modified form of piston packing ring A. This ring is shown as having its lower end face provided with a plurality of ventilating recesses 6''' similar to recesses 6 in Fig. 3 and the end walls thereof are arcuately shaped, as at 7''', the same as the end walls 7 shown in Figs. 2 and 3. By forming the arcuately shaped ventilating recesses 6''' in the lower face of the ring and open to the outer and inner peripheries and to the lower end face thereof, there is provided thereby a plurality of spaced angularly shaped projections, or tabs 8''' similar to the projections 8 shown in Figs. 2 and 3. The projections 8''' are each provided in their outer peripheral face with a channel 14' so that the recesses 6''' will be groove connected. The ring is thus provided with a continuous upper land 3''' and spaced lower lands 4'''.

From the foregoing description, it is evident that I have provided a piston ring provided on its lower end face with a plurality of ventilating recesses fully open to the outer peripheral face of the ring, fully open to the lower end face of the ring and partially open to the inner peripheral face of the ring, and that the said ventilating recesses have their end walls converging from the outer periphery of the ring to the inner periphery thereof.

The many advantages of the herein described invention will readily suggest themselves to those skilled in the art to which it appertains.

From the foregoing description, it is evident that a simple device for this purpose has been disclosed, but it is to be understood that I do not desire to restrict, or limit myself to the very details of the construction shown and described, which is merely illustrative, it being obvious that changes, not involving the exercise of invention may be made without conflicting or departing from the spirit of the invention within the scope of the appended claims.

What I claim is:

1. A piston ring having spaced arcuately shaped ventilating recesses and vertically spaced outer facial channels, the upper of said channels being continuous, the lower of said channels being spaced circumferentially of the ring, separated at adjacent ends by the ventilating recesses and communicating with said recesses.

2. A piston ring comprising a split ring member having a continuous circumferential groove in its outer peripheral face providing a pair of spaced continuous lands, said split ring member having a series of open ended radial ventilating grooves formed on one end face thereof providing a series of tab sections therebetween, said tab sections having grooves in their outer faces in circumferential alignment to provide spaced circumferentially aligned lands between the radial ventilating grooves, and the outer faces of all the aforesaid lands lying in a vertical plane.

3. A split piston ring having a series of open ended radial ventilating grooves formed in one end thereof and providing thereby a series of tab sections therebetween, a pair of continuous split lands on the ring, and said tab sections having outer facial grooves formed therein in circumferential alignment to provide spaced circumferentially aligned lands between the ventilating grooves.

4. A split piston ring having a continuous outer facial groove and a series of open ended radial ventilating grooves formed with opposed arcuately shaped walls in one end of the ring and providing thereby a series of tab sections, and said tab sections having outer facial grooves to provide spaced circumferentially aligned lands at the radially grooved end of the ring.

5. A ventilated piston ring consisting of a split ring like member having a continuous outer facial groove to provide a pair of spaced continuous circumferential lands, a series of open ended radial ventilating grooves formed in one end of the ring like member providing spaced tab sections thereon, said tab sections having outer facial grooves in circumferential alignment to provide lands thereon in circumferential alignment between the ventilating grooves, and the ring being of like diametrical dimensions through all of the aforesaid lands.

6. A piston ring, as defined in claim 5, wherein one of the tab sections is separable and formed on adjacent end portions of the split ring like member in such fashion as to provide a step-joint therebetween.

7. A ventilated piston consisting of a split ring member having a continuous outer facial groove to provide spaced continuous relatively narrow circumferential lands, said ring member having a series of open ended radial ventilating grooves formed in one end thereof to provide a series of tab sections between the ventilating grooves, and said tab sections having outer facial grooves to provide each tab section with a land at its free outer edge.

8. A split piston ring having a series of spaced open ended radial ventilating recesses in one end face thereof providing a series of tab sections therebetween, and the outer faces of said tab sections having circumferentially aligned grooves formed therein to provide a continuous land adjacent the base of the tab sections, and a series of spaced circumferentially aligned lands at the radially grooved end of the ring.

9. A split piston ring having a continuous circumferential groove in its outer face and a series of spaced radial ventilating grooves formed in one end face thereof to provide a series of tab sections therebetween, and the outer faces of said tab sections having circumferentially aligned grooves formed therein to provide a series of circumferentially aligned lands at the free outer edges of the tab sections and the ring through all of the lands being of the same diameter.

10. A piston ring having a continuous circumferential groove in its outer peripheral face adjacent one end of the ring to provide two spaced relatively narrow circumferential lands and provided in the opposite end face of the ring with a series of open ended radial grooves out of communication with said circumferential groove and providing thereby a series of tab sections therebetween with arcuately shaped walls, and the outer faces of the tab sections having circumferentially aligned grooves therein to provide the tab sections with circumferentially aligned lands having the same diametrical dimensions as the aforesaid two lands.

11. A piston ring having its outer peripheral face divided by a circumferential groove to form a pair of cylinder wall engaging lands, the ring being provided in an end face thereof with a series of open ended radial ventilating grooves wider at their outer ends than at their inner ends, each of said ventilating grooves being open at its inner end to the inner peripheral face of the ring and at its outer end to the outer peripheral face of the ring, and the outer faces of the tab sections having circumferentially aligned grooves therein to provide a series of spaced circumferentially aligned lands, and the diameter of the ring through all of the aforesaid lands being the same.

12. A piston ring having its outer peripheral face divided by a continuous circumferential groove, disposed closer to one end of the ring than the other, into a pair of cylinder wall engaging lands, the ring being provided in the end face farthest from said groove with a series of open ended radial grooves having arcuately shaped walls of a depth reaching one of said pair of lands but not communicating with the groove between said pair of lands, said radial grooves dividing the ring below said pair of lands into a series of tab sections, and said tab sections having their outer faces provided with circumferentially aligned grooves providing the tab sections with circumferentially aligned lands to fashion the ring with three lands at the tab sections thereof and two lands adjacent the radially grooved sections thereof.

13. A piston ring having one of its end faces divided by a series of open ended radial grooves, having opposed arcuately shaped walls, into a series of tab sections, and the outer faces of said tab sections having circumferentially aligned grooves therein forming a series of spaced unconnected circumferentially aligned cylinder wall engaging lands at the radially grooved end of the piston ring.

14. A split piston ring having a series of open ended radial ventilating grooves formed in one end face thereof and providing thereby a series of tab like sections therebetween, a continuous split land at one end of the ring, and lands formed at the free outer edge portion of each tab like section by grooving the tab like sections.

15. A piston ring having a series of radial ventilating recesses formed in the lower face thereof and open also to the inner and outer peripheral faces of the ring to provide a series of tab like sections, a land adjacent the upper ends of the ventilating recesses and said tab like sections, and a land adjacent the lower end of each tab like section.

16. A split piston ring member having its lower face provided with a series of spaced radial recesses to provide alternate tab sections, the recesses being also open to the inner and outer peripheral faces of the ring, there being a split land adjacent the upper ends of the recesses and the tab sections and there being a land adjacent the lower face of each tab section, and the lower faces of the tab sections including the lands serving as bearing portions.

HAROLD P. PHILLIPS.